UNITED STATES PATENT OFFICE.

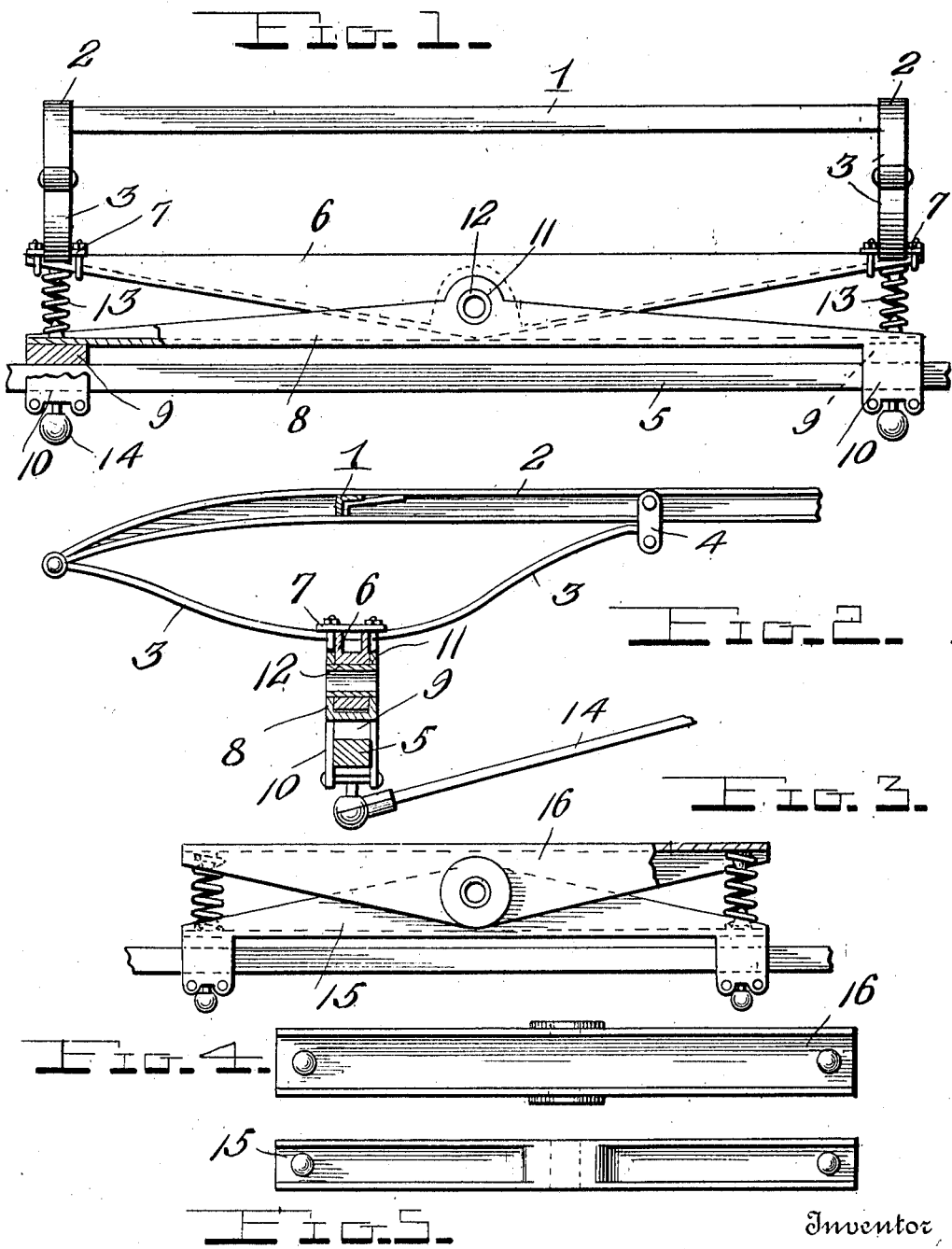

DAVID M. DEARING, OF JACKSON, MICHIGAN.

RUNNING-GEAR FOR MOTOR-VEHICLES.

1,026,851.  Specification of Letters Patent.  Patented May 21, 1912.

Application filed November 12, 1909. Serial No. 527,625.

*To all whom it may concern:*

Be it known that I, DAVID M. DEARING, a citizen of the United States, residing at Jackson, in the county of Jackson and State of Michigan, have invented certain new and useful Improvements in Running-Gear for Motor-Vehicles; and I do declare the following to be a full, clear, and exact description of the invention, such as will enable others skilled in the art to which it appertains to make and use the same.

This invention relates to improvements in running gears for motor vehicles and more especially for providing a yielding supporting frame therefor.

The primary object of the invention is to provide a pivotally yielding constructively arranged frame which is adapted to be properly held in its relative position in respect to the body of the vehicle.

Briefly stated the invention consists of the employment of two hingedly connected members, the lower one of which is adapted to be rigidly secured to the axle of the vehicle, the upper member having yielding springs disposed between its ends and the end of the securing portions of the first named member, whereby the same is yieldingly supported, a supporting cross bar to which the body of the vehicle is secured and having its opposite ends supported and properly positioned above the r vable member of the frame previously rererred to by centralizing springs positioned above the yielding opposite ends of the frame, and brace rods movably attached to the oppositely connected arms of the frame whereby the latter is held in its proper position during the various movements of the body of the vehicle.

With these and other objects in view, the invention consists of certain novel features of construction, and the combination and arrangements of parts as will be more fully described and claimed.

In the accompanying drawings: Figure 1 is a rear view of the supporting frame constructed according to the invention; Fig. 2 is a central vertical section of the same;
Fig. 3 is a front view of a slightly modified arrangement of the form of connection shown in Fig. 1 with the supporting frame removed therefrom; Fig. 4 is a bottom plan view of the upper hollow bolster; and Fig. 5 is a top plan view of the same.

Referring to the illustrative employment of the invention 1 designates the front cross bar of the supporting frame to which the body of the vehicle is adapted to be secured in the usual manner, and 2 the side bars of the frame which are connected by said cross bar 1, as shown in Fig. 2. The side bars 2 are extended rearwardly and curved downwardly and movably secured to their ends is one end of the elliptic springs 3 the opposite ends of the latter being movably attached to the lugs 4, depending from the side bars 2.

The lower constructive portion of the frame comprises a channel shaped bar 8 which is wider at its central portion and has its upper edges tapered or inclined from the center toward the outer ends, as shown. The lower member has formed on its lower side and at its opposite ends spacing blocks 9 which are engaged with the axle 5 adjacent its outer ends, and the member 8 is securely fastened to the said axle at the points of engagement by downwardly projecting pairs of plates 10, which closely engage the opposite sides of the axle and are secured thereto by transversely disposed bolts or other suitable fastening devices located below said axle.

In the central portion of the lower member 8 are formed alined bearing apertures 11 and when said upper and lower members of the connections are assembled, the upper member is inserted in the lower member and the alined apertures in said members brought opposite each other and through said apertures is inserted a tubular bearing shaft 12, through which the cranking shaft (not shown) is freely passed.

Between the outer separated ends of the members 6 and 8 of the frame are disposed coiled cushioning or shock absorbing springs 13 and to the lower sides of the axle 5, immediately below the connected ends of the fixed member 8 of the frame are movably secured the ends of rearwardly projecting brace rods 14, the connected ends of the same being provided with a socket joint for the purpose hereinafter described.

By the employment of the brace rods 14 and their arrangement and position in respect to the plates 10 the yielding supporting frame thus constructed is permitted to resiliently accommodate for the various angles and inclinations of the body of the vehicle, said rods being adapted to further prevent the lateral displacement of the parts thus connectively and yieldingly arranged.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined and claimed.

Having thus described my invention, what I claim is:

In a motor vehicle running gear comprising a supporting frame composed of two members hingedly connected with their ends separated, springs disposed between the opposite ends of the members of the frame whereby the upper section thereof is held substantially in a horizontal position, a body supporting frame, elliptic springs having their opposite ends movably attached to the last named frame with their medial portions secured to the opposite ends of the movable portion of the supporting frame adjacent to the opposite ends thereof and immediately above the coiled springs positioned below the same, and brace rods secured to the attaching ends of the lower fixed member of the supporting frame and below the axle of the vehicle whereby the parts yieldingly connected are held in their proper position in respect to the body supporting frame.

In testimony whereof I have hereunto set my hand in presence of two subscribing witnesses.

DAVID M. DEARING.

Witnesses:
 JAMES S. ALLEN,
 SAMUEL L. BECK.